United States Patent
Zeng (10) Patent No.: US 12,346,590 B2
(45) Date of Patent: Jul. 1, 2025

(54) DATA PARTITIONING METHOD AND DATA PROCESSING METHOD

(71) Applicant: INFINI Data (Beijing) Technology Co., Ltd., Beijing (CN)

(72) Inventor: Yong Zeng, Changsha (CN)

(73) Assignee: INFINI Data (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 18/371,180

(22) Filed: Sep. 21, 2023

(65) Prior Publication Data
US 2024/0393972 A1 Nov. 28, 2024

(30) Foreign Application Priority Data
May 25, 2023 (CN) .......................... 202310597709.3

(51) Int. Cl.
G06F 12/00 (2006.01)
G06F 3/06 (2006.01)

(52) U.S. Cl.
CPC ............ G06F 3/0644 (2013.01); G06F 3/064 (2013.01); G06F 3/067 (2013.01); G06F 3/0604 (2013.01)

(58) Field of Classification Search
CPC ........ G06F 3/0644; G06F 3/064; G06F 3/067; G06F 3/0604; Y02D 10/00
See application file for complete search history.

(56) References Cited

U.S. PATENT DOCUMENTS

| | | | |
|---|---|---|---|
| 9,489,443 B1 * | 11/2016 | Muniswamy-Reddy | G06F 16/27 |
| 9,849,443 B2 * | 12/2017 | Harada | B01J 37/0244 |
| 2015/0301759 A1 * | 10/2015 | Gu | G06F 3/0607 711/114 |
| 2019/0294339 A1 * | 9/2019 | Bolkhovitin | G06F 3/0607 |

* cited by examiner

*Primary Examiner* — Arvind Talukdar
(74) *Attorney, Agent, or Firm* — Bay State IP, LLC (57) ABSTRACT

A data partitioning and processing method having the following steps: receiving a partitioned storage capacity sent by each storage node in a distributed storage system; wherein the partitioned storage capacity is a storage capacity of each partition included in the storage node; determining a storage capacity of an i-th rolling block according to the partitioned storage capacity; determining whether the storage capacity of the i-th rolling block meets a preset condition according to the storage capacity of the i-th rolling block; creating an (i+1)-th rolling block in response to the fact that the storage capacity of the i-th rolling block meets a preset condition; splitting the (i+1)-th rolling block into N partitions on average; and establishing a mapping relationship between N partitions in the (i+1)-th rolling block and storage nodes in the distributed storage system, so that the storage node writes data into the partitions according to the mapping relationship.

8 Claims, 7 Drawing Sheets

DATA PARTITIONING METHOD AND DATA PROCESSING METHOD

CROSS REFERENCE TO RELATED APPLICATION

This application claims takes priority from and claims the benefit of Chinese Patent Application No. 202310597709.3 filed on May 25, 2023, the contents of which are herein incorporated by reference.

TECHNICAL FIELD

The present disclosure relates to the technical field of distributed databases, in particular to a data partitioning method and a data processing method.

BACKGROUND

A distributed storage system is a storage system that stores data in a plurality of independent storage devices dispersedly, and each storage device is equivalent to a storage node. At present, the common partitioning methods of the distributed storage system include a hash-based partitioning method and a value range-based partitioning method, but the above methods need to dynamically split and merge according to the changes of data when dealing with massive data, and the data processing is complicated.

SUMMARY

In order to solve the above problems, the present disclosure provides a data partitioning method and a data processing method.

According to a first aspect of the present disclosure, there is provided a data partitioning method, wherein the method is applied to a master node in a distributed storage system, including:
  receiving a partitioned storage capacity sent by each storage node in the distributed storage system; wherein the partitioned storage capacity is a storage capacity of each partition included in the storage node;
  determining a storage capacity of an i-th rolling block according to the partitioned storage capacity, where i is a positive integer;
  determining whether the storage capacity of the i-th rolling block meets a preset condition according to the storage capacity of the i-th rolling block;
  creating an (i+1)-th rolling block in response to the fact that the storage capacity of the i-th rolling block meets a preset condition; wherein the (i+1)-th rolling block is capable of accommodating M pieces of data, where M is a positive integer;
  splitting the (i+1)-th rolling block into N partitions on average, where N is an integer greater than or equal to 2; and
  establishing a mapping relationship between N partitions in the (i+1)-th rolling block and storage nodes in the distributed storage system, so that the storage node writes data into the partitions according to the mapping relationship.

That is to say, with the increase of data amount, this scheme can increase rolling blocks continuously, and at the same time split each rolling block into N partitions, so that the dynamic increase of partitions can be realized by increasing rolling blocks continuously to deal with the writing pressure of data, which not only can improve the system performance, but also avoid the problems of maintenance cost and performance loss caused by the data splitting and merging process.

According to a second aspect of the present disclosure, there is provided a data processing method, wherein the method is applied to a storage node in a distributed storage system, including:
  when receiving a data write request, determining at least one available rolling block based on a storage capacity of each partition in a rolling block created by a master node of the distributed storage system;
  determining a partition into which a target is to be written from available partitions included in the at least one available rolling block;
  allocating a system ID to data to be written corresponding to the data write request according to the partition into which the target is to be written; wherein the system ID includes a rolling block ID and an internal self-increasing ID;
  writing the data to be written and the allocated system ID into the partition into which the target is to be written.

As a possible implementation, writing the data to be written and the allocated system ID into the partition into which the target is to be written includes:
  determining whether the partition into which the target is to be written is in the storage node based on a mapping relationship between each partition and the storage node established by the master node;
  if the partition into which the target is to be written is in the storage node, writing the data to be written and the allocated system ID into the partition into which the target is to be written; otherwise,
  sending the data to be written to the storage node where the partition into which the target is to be written is located.

In some embodiments of the present disclosure, determining a partition into which a target is to be written from available partitions included in the at least one available rolling block includes: determining whether the data to be written has a user-defined ID;
  if the data to be written does not have the user-defined ID, determining the partition into which the target is to be written from the available partitions included in the at least one available rolling block according to a preset allocation strategy;
  if the data to be written has a user-defined ID, carrying out hash modulo operation on the user-defined ID;
  determining the partition into which the target is to be written from the available partitions included in the at least one available rolling block according to a result of the hash modulo operation.

Determining the partition into which the target is to be written from the available partitions included in the at least one available rolling block according to a result of the hash modulo operation includes:
  determining a partition into which a target is to be written that matches the result of the hash modulo operation from the available partitions included in the at least one available rolling block according to the order in which the rolling blocks are created.

As a possible implementation, allocating a system ID to data to be written corresponding to the data write request according to the partition into which the target is to be written includes:
  determining a target internal self-increasing ID rule corresponding to the partition into which the target is to be written; wherein the internal self-increasing ID rule is configured when the master node splits the rolling block, and the internal self-increasing ID rule of each partition in the rolling block is different;

determining the internal self-increasing ID in the system ID according to the internal self-increasing ID rule of the partition into which the target is to be written;

determining the rolling block ID in the system ID according to the rolling block where the partition into which the target is to be written is located.

In other embodiments of the present disclosure, the method further includes:

when receiving a data operation request, acquiring a target ID of data to be operated corresponding to the data operation request; wherein the data operation request is one of a data deletion request, a data query request and a data modification request;

determining a target partition where the data to be operated is stored according to the target ID;

judging whether the target partition is in the storage node based on the mapping relationship;

if the target partition is in the storage node, performing data operation on the data to be operated in the target partition;

if the target partition is not in the storage node, forwarding the data operation request to the storage node corresponding to the target partition.

As a possible implementation, determining a target partition where the data to be operated is stored according to the target ID includes:

judging whether the target ID is a system ID;

if the target ID is a system ID, determining a target rolling block ID and a target internal self-increasing ID in the target ID;

acquiring an internal self-increasing ID rule of each partition in a target rolling block corresponding to the target rolling block ID;

determining the target partition according to the target internal self-increasing ID based on the internal self-increasing ID rule of each partition in the target rolling block;

if the target ID is a user-defined ID, carrying out hash modulo operation on the target ID, and determining the target partition based on a result of the hash modulo operation.

In addition, the method can further include:

reporting the storage capacity of each partition included in the storage node to the master node in the distributed storage system.

This scheme is based on the logical structure of rolling blocks and partitions established by the master node, and the storage node writes data into each corresponding partition, so that the system performance can be improved by partitioning the logical structure of rolling blocks and partitions.

According to a third aspect of the present disclosure, there is provided a data partitioning device, wherein the device is applied to a master node in a distributed storage system, including:

a receiving module, which is configured to receive a partitioned storage capacity sent by each storage node in the distributed storage system; wherein the partitioned storage capacity is a storage capacity of each partition included in the storage node;

a first determining module, which is configured to determine a storage capacity of an i-th rolling block according to the partitioned storage capacity, where i is a positive integer;

a second determining module, which is configured to determine whether the storage capacity of the i-th rolling block meets a preset condition according to the storage capacity of the i-th rolling block;

a creating module, which is configured to create an (i+1)-th rolling block in response to the fact that the storage capacity of the i-th rolling block meets a preset condition; wherein the (i+1)-th rolling block is capable of accommodating M pieces of data, where M is a positive integer;

a splitting module, which is configured to split the (i+1)-th rolling block into N partitions on average, where N is an integer greater than or equal to 2; and an establishing module, which is configured to establish a mapping relationship between N partitions in the (i+1)-th rolling block and storage nodes in the distributed storage system, so that the storage node writes data into the partitions according to the mapping relationship.

According to a fourth aspect of the present disclosure, there is provided a data processing device, wherein the device is applied to a storage node in a distributed storage system, including:

a first determining module, which is configured to, when receiving a data write request, determine at least one available rolling block based on a storage capacity of each partition in a rolling block created by a master node of the distributed storage system;

a second determining module, which is configured to determine a partition into which a target is to be written from available partitions included in the at least one available rolling block;

an allocating module, which is configured to allocate a system ID to data to be written corresponding to the data write request according to the partition into which the target is to be written; wherein the system ID includes a rolling block ID and an internal self-increasing ID;

a writing module, which is configured to write the data to be written and the allocated system ID into the partition into which the target is to be written.

As a possible implementation, the writing module is specifically configured to:

determine whether the partition into which the target is to be written is in the storage node based on a mapping relationship between each partition and the storage node established by the master node;

if the partition into which the target is to be written is in the storage node, write the data to be written and the allocated system ID into the partition into which the target is to be written; otherwise, send a data write request to the storage node where the partition into which the target is to be written is located.

In some embodiments of the present disclosure, the second determining module is specifically configured to:

determine whether the data to be written has a user-defined ID;

if the data to be written does not have the user-defined ID, determine the partition into which the target is to be written from the available partitions included in the at least one available rolling block according to a preset allocation strategy;

if the data to be written has a user-defined ID, carry out hash modulo operation on the user-defined ID;

determine the partition into which the target is to be written from the available partitions included in the at least one available rolling block according to a result of the hash modulo operation.

As an example, the second determining module is further configured to:
- determine a partition into which a target is to be written that matches the result of the hash modulo operation from the available partitions included in the at least one available rolling block according to the order in which the rolling blocks are created.

In some embodiments of the present disclosure, the allocating module is specifically configured to:
- determine a target internal self-increasing ID rule corresponding to the partition into which the target is to be written; wherein the internal self-increasing ID rule is configured when the master node splits the rolling block, and the internal self-increasing ID rule of each partition in the rolling block is different;
- determine the internal self-increasing ID in the system ID according to the internal self-increasing ID rule of the partition into which the target is to be written;
- determine the rolling block ID in the system ID according to the rolling block where the partition into which the target is to be written is located.

In other embodiments of the present disclosure, the device further includes a data operation module, wherein the data operation module is configured to:
- when receiving a data operation request, acquire a target ID of data to be operated corresponding to the data operation request; wherein the data operation request is one of a data deletion request, a data query request and a data modification request;
- determine a target partition where the data to be operated is stored according to the target ID;
- judge whether the target partition is in the storage node based on the mapping relationship;
- if the target partition is in the storage node, perform data operation on the data to be operated in the target partition;
- if the target partition is not in the storage node, forward the data operation request to the storage node corresponding to the target partition.

As an example, the data operation module is specifically configured to:
- judge whether the target ID is a system ID;
- if the target ID is a system ID, determine a target rolling block ID and a target internal self-increasing ID in the target ID;
- acquire an internal self-increasing ID rule of each partition in a target rolling block corresponding to the target rolling block ID;
- determine the target partition according to the target internal self-increasing ID based on the internal self-increasing ID rule of each partition in the target rolling block;
- if the target ID is a user-defined ID, carry out hash modulo operation on the target ID, and determine the target partition based on a result of the hash modulo operation.

In addition, the device further includes a reporting module, wherein the reporting module is specifically configured to:
- report the storage capacity of each partition included in the storage node to the master node in the distributed storage system.

According to the technical scheme of the present disclosure, a master node receives a partitioned storage capacity sent by each storage node, a storage capacity of an i-th rolling block is determined according to the partitioned storage capacity; it is determined whether the storage capacity of the i-th rolling block meets a preset condition according to the storage capacity of the i-th rolling block; an (i+1)-th rolling block is created in response to the fact that the storage capacity of the i-th rolling block meets a preset condition, the (i+1)-th rolling block is split into N partitions on average, and a mapping relationship between N partitions in the (i+1)-th rolling block and storage nodes is established, so that the storage node writes data into the partitions according to the mapping relationship. That is to say, with the increase of data amount, this scheme can increase rolling blocks continuously, and at the same time split each rolling block into N partitions, so that the dynamic increase of partitions can be realized by increasing rolling blocks continuously to deal with the writing pressure of data, which not only can improve the system performance, but also avoid the problems of maintenance cost and performance loss caused by the data splitting and merging process.

Additional aspect and advantages of the present disclosure will be set forth in part in the following description, and in part will be obvious from the following description, or may be learned by practice of the present disclosure.

BRIEF DESCRIPTION OF THE DRAWINGS

The above and/or additional aspects and advantages of the present disclosure will be apparent and easily understood from the following description of embodiments taken in conjunction with the accompanying drawings, in which.

DETAILED DESCRIPTION OF THE EMBODIMENTS

Hereinafter, embodiments of the present disclosure will be described in detail, examples of which are illustrated in the accompanying drawings, wherein the same or similar reference numerals indicate the same or similar elements or elements having the same or similar functions throughout. The embodiments described hereinafter with reference to the attached drawings are exemplary and are intended to explain the present disclosure, rather than be construed as limitations of the present disclosure.

It should be noted that a distributed storage system is a storage system that stores data in a plurality of independent storage devices dispersedly, and each storage device is equivalent to a storage node. At present, the partitioning methods of the distributed storage system mainly include a hash-based partitioning method and a value range-based partitioning method. The hash-based partitioning method specifically includes a fixed-factor hash modulus partitioning method and a consistent hash algorithm. The value range-based partitioning method requires that the data meet a certain rule, such as a numerical range, a time range and so on.

However, the range-based partitioning algorithm requires a higher requirement for the dispersion value range of data. The fixed-factor hash partitioning method needs to specify a fixed partition factor when the database is created. Therefore, in the process of continuously writing data, if the partition factor is set too large and the number of documents actually written is relatively small, over-allocation of resources may occur, and the overall cluster performance is influenced. If the partition factor is set too small, with the continuous writing of data, there may be a problem that the current partition factor cannot bear the reading and writing requirements, thus affecting performance. Because the specific data amount cannot be predicted in advance when setting the partition factor, subsequent division or splitting of partitions may be required.

In addition, when using the consistent hashing algorithm to deal with massive data, there are also the following problems. (1) It is impossible to finely adapt to heterogeneous systems (the performance of different servers may be different), and the consistent hashing algorithm can only deal with the heterogeneous systems by adjusting the weights. The weighted data partitioning method will make the operation and maintenance work extremely complicated in large-scale clusters, and it is impossible to finely allocate the hardware resources of the heterogeneous systems and exert all its storage capacity. (2) Due to the lack of flexibility, the consistent hashing algorithm can only decide which partition data should belong to through a fixed algorithm. In the scene of massive data, more flexible partitioning methods are needed to support users to split domain data vertically and flexibly control the number of partitions, so as to improve the overall reading and writing performance of the cluster.

In order to solve the above problems, the present disclosure provides a data partitioning method and a data processing method.

Figure 1:
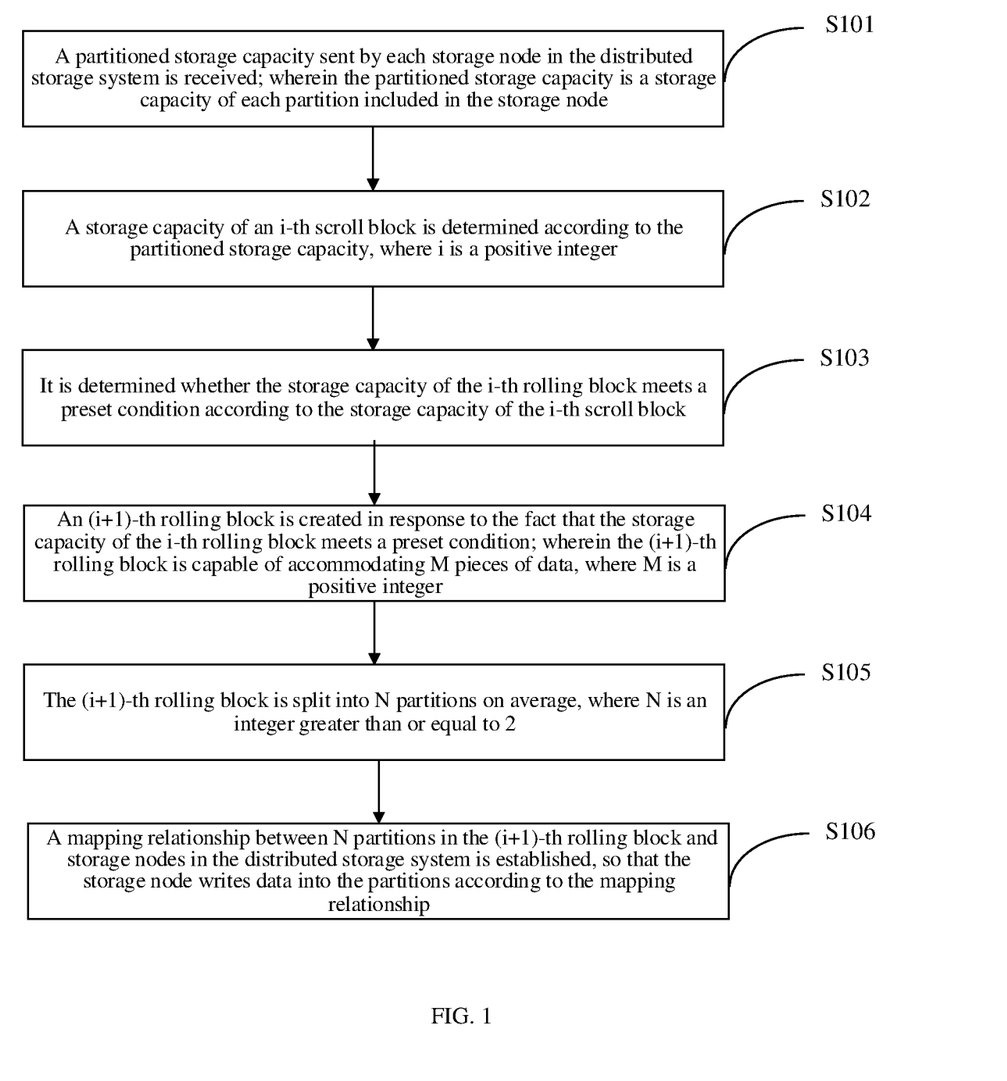
FIG. 1 is a flowchart of a data partitioning method according to an embodiment of the present disclosure.

FIG. 1 is a flowchart of a data partitioning method according to an embodiment of the present disclosure. The data partitioning method in the embodiment of the present disclosure is applied to a master node of a distributed storage system. The distributed storage system includes a master node and a storage node. The master node refers to a metadata management master node in the distributed storage system, and the storage node refers to a storage device in which data is stored. As shown in FIG. 1, the method includes the following steps.

Step S101, a partitioned storage capacity sent by each storage node in the distributed storage system is received; wherein the partitioned storage capacity is a storage capacity of each partition included in the storage node.

Each storage node can include at least one partition. The storage node can send a partitioned storage capacity to the master node at fixed intervals, or send a partitioned storage capacity to the master node after writing data every time, or send a partitioned storage capacity to the master node in real time, which can be determined based on actual requirements.

Step S102, a storage capacity of an i-th rolling block is determined according to the partitioned storage capacity, where i is a positive integer.

In some embodiments of the present disclosure, a rolling block refers to a logical area in which data is stored. The storage capacity of the i-th rolling block refers to the storage capacity of data written in the i-th rolling block in total, that is, the sum of the storage capacity of each partition.

Step S103, it is determined whether the storage capacity of the i-th rolling block meets a preset condition according to the storage capacity of the i-th rolling block.

Step S104, an (i+1)-th rolling block is created in response to the fact that the storage capacity of the i-th rolling block meets a preset condition; wherein the (i+1)-th rolling block is capable of accommodating M pieces of data, where M is a positive integer.

In some embodiments of the present disclosure, the fact that the data amount of the i-th rolling block meets the preset condition may mean that the data amount of the i-th rolling block meets the preset condition, that is, the data amount of the i-th rolling block reaches the preset capacity of the rolling block, or the data amount of the i-th rolling block reaches ¾ of the preset capacity of the rolling block, or the data in at least one partition in the i-th rolling block is full, or there may be other conditions based on actual needs, which is not limited by the present disclosure.

In some embodiments of the present disclosure, the (i+1)-th rolling block is capable of accommodating M pieces of data, where the M pieces of data are values set based on actual needs. As an example, if the preset capacity of a rolling block is unit 32, each rolling block can accommodate at most $2^{32}-1$ pieces of data.

Step S105, the (i+1)-th rolling block is split into N partitions on average, where N is an integer greater than or equal to 2.

Step S106, a mapping relationship between N partitions in the (i+1)-th rolling block and storage nodes in the distributed storage system is established, so that the storage node writes data into the partitions according to the mapping relationship.

It can be understood that the partition in the rolling block refers to a logical partition, which has a mapping relationship with the physical storage devices of the storage nodes in the distributed storage system. That is to say, the purpose of establishing such logical relationship is actually to make each storage node store data in partitions according to such logical relationship. On the one hand, the writing pressure can be balanced, and on the other hand, the dynamic increase of partitions can be realized for infinitely growing data, and the problems of maintenance cost and performance loss caused by the data splitting and merging process can also be avoided.

N can be a default value of the system or a value set by the relevant staff based on the actual situation. In addition, when the master node splits the rolling block, the master node configures the internal self-increasing ID rule for each partition of the rolling block. The internal self-increasing ID refers to the identification information that the storage node allocates to the data based on the writing order when writing the data. The internal self-increasing ID rule configured in each partition refers to the respective rule for the internal self-increasing ID allocated to the data written in each partition. As an example, if N=2 and i=2, that is, a third rolling block includes two partitions, namely, partition A and partition B. The internal self-increasing ID rule configured by each partition can be as follows: the internal self-increasing ID in partition A is odd, and the internal self-increasing ID in partition B is even. In this way, when the storage node bearing partition A writes data into partition A, the internal self-increasing ID allocated to the data is odd, and when the storage node bearing partition B writes data into partition B, the internal self-increasing ID allocated to the data is even.

In addition, the internal self-increasing ID rule can also be the basis for the storage node to determine the partition where the data is stored based on the internal self-increasing ID. Based on the above example, if the internal self-increasing ID of a piece of data is odd, the storage node can determine that the piece of data is stored in partition A based on the internal self-increasing ID; and if the internal self-increasing ID of a piece of data is even, the storage node can determine that the piece of data is stored in partition B based on the internal self-increasing ID.

As another example, if N is 128, the internal self-increasing ID rule configured by each partition can be as follows: the internal self-increasing ID in partition 1 is modulo N hash with the result of 1, the internal self-increasing ID in partition 2 is modulo N hash with the result of 2, the internal self-increasing ID in partition 3 is modulo N hash with the result of 3, and so on. The internal self-increasing ID in partition 127 is modulo N hash with the result of 127, and the internal in partition 128 is modulo N hash with the result of 0.

In some embodiments of the present disclosure, the mapping relationship between N partitions in the (i+1)-th rolling block and storage nodes in the distributed storage system is established, which may be the mapping relationship established by the master node based on user configuration or by the master node based on the configured allocation algorithm.

As an example, if N=2 and i=2, a third rolling block includes partition A and partition B. The distributed storage system includes two storage nodes, namely storage node A and storage node B. the mapping relationship established in this case can be such that partition A of the third rolling block corresponds to storage node A, and partition B of the third rolling block corresponds to storage node B. In this way, part of storage space in storage node A corresponds to partition A of the third rolling block, and part of storage space in storage node B corresponds to partition B of the third rolling block. If data is written into partition A of the third rolling block, the data is executed by storage node A, and if data is written into partition B of the third rolling block, the data is executed by storage node B.

In some embodiments of the present disclosure, the data partitioning method may further include: creating a first rolling block when a request for creating a database is received; wherein the first rolling block is the i-th rolling block when i=1, and the first rolling block can accommodate M pieces of data; dividing the first rolling block into N partitions on average; and establishing a mapping relationship between N partitions in the first rolling block and storage nodes in the distributed storage system.

Figure 2:
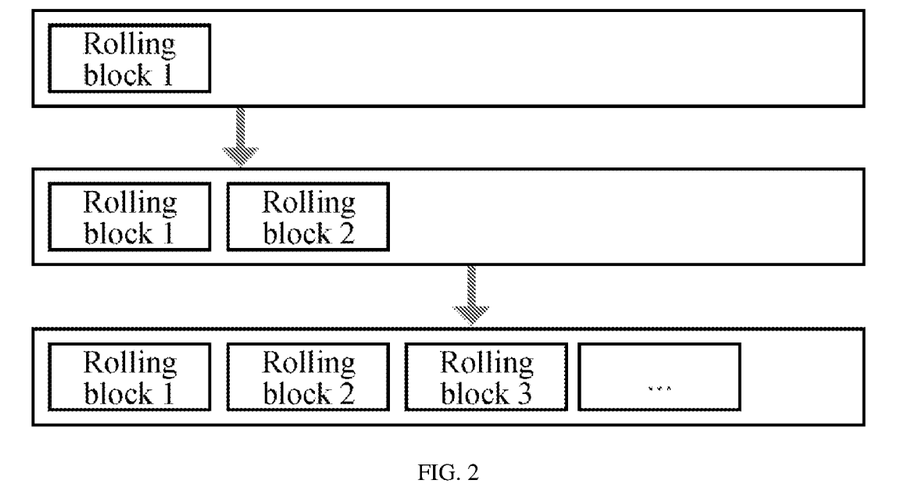
FIG. 2 is an example diagram of creating a rolling block in an embodiment of the present disclosure.

That is to say, after the master node creates the database, the master node starts with the first rolling block and continues to create the second rolling block, the third rolling block, and so on with the increase of data, so as to meet the continuous growth demand of data. As shown in FIG. 2, the master node creates rolling blocks in this order, creates the first rolling block when receiving the request to create a database, creates the second rolling block after the data amount of the first rolling block meets the preset condition, creates the third rolling block after the data amount of the second rolling block meets the preset condition, and so on.

Figure 3:
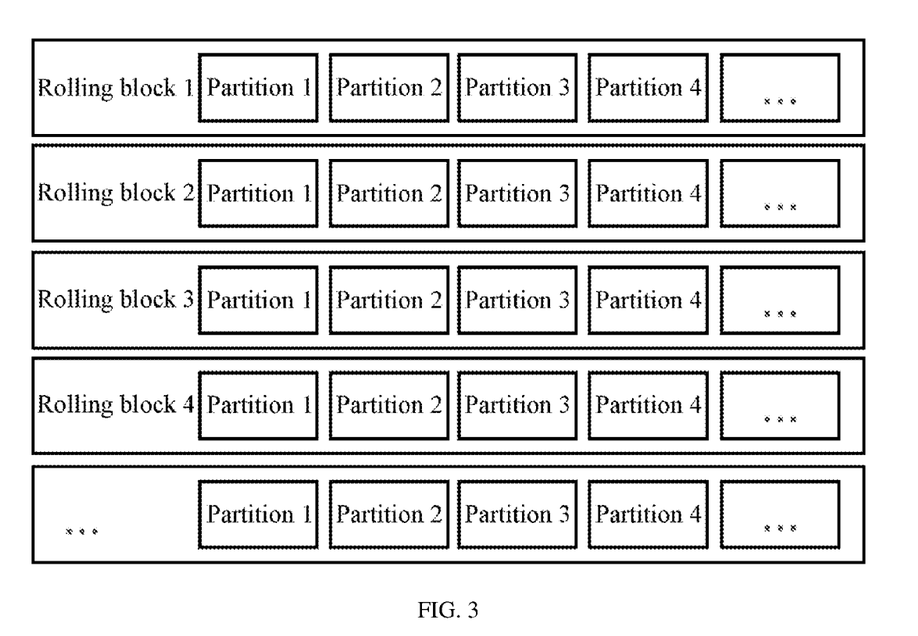
FIG. 3 is an example diagram of a logical structure of a database in an embodiment of the present disclosure.

In some embodiments of the present disclosure, the rolling blocks created by the master node and the partitions of each rolling block can be identified by their own identification information. For example, the rolling block can have the number of the rolling block, and the partition in each rolling block can have the number of the partition. The number of the partition may or may not carry the number of the rolling block. FIG. 3 is an example diagram of a logical structure of a database in an embodiment of the present disclosure. As shown in FIG. 3, with the continuous writing of data, rolling blocks are continuously increased, each rolling block is split into N partitions, and all the created rolling blocks constitute the whole database. Each rolling block has its own number, and the partition in each rolling block also corresponds to an identifier. The data is stored in each partition, and each partition is independent of each other. Such storage structure splits the data according to the horizontal and vertical dimensions. By creating rolling blocks, the data partitions can be dynamically increased to meet the demand of increasing data, and the system performance can also be improved.

It should be noted that the master node can also distribute the created rolling block information and partition information to the storage nodes, wherein the created rolling block information and partition information can include the created rolling blocks, the data amount that each rolling block can accommodate, the partitions included in each rolling block, the internal self-increasing ID rule of each partition, and the mapping relationship between each partition and at least one storage node. In this way, the storage node can know which rolling blocks have been created at present, how many pieces of data each rolling block can accommodate, what partitions are in each rolling block, and the storage nodes corresponding to these partitions.

The master node can distribute the above information to the storage node in real time, or distribute the above information to the storage node every time a new rolling block is created, or distribute the above information to the storage node at set intervals, which is not limited in the present disclosure. As an example, the master node can send the created rolling block and its number, the partition included in the rolling block and its number, the data amount that each partition in the rolling block can accommodate, and the mapping relationship between each partition and the storage node to the storage node of the distributed storage system after each rolling block is created and the mapping relationship between the partition of the rolling block and the storage node is established.

In addition, the master node can also summarize the partitioned storage capacity sent by each storage node after receiving the partitioned storage capacity sent by each storage node in the distributed storage system, so as to obtain the storage capacity of each partition in the created rolling block, and send the storage capacity of each partition in the created rolling block to each storage node, so that the storage node can obtain the storage situation of each partition in the created rolling block.

According to the data partitioning method of the embodiment of the present disclosure, a master node receives a partitioned storage capacity sent by each storage node, a storage capacity of an i-th rolling block is determined according to the partitioned storage capacity; it is determined whether the storage capacity of the i-th rolling block meets a preset condition according to the storage capacity of the i-th rolling block; an (i+1)-th rolling block is created if the storage capacity of the i-th rolling block meets a preset condition, the (i+1)-th rolling block is split into N partitions on average, and a mapping relationship between N partitions in the (i+1)-th rolling block and storage nodes is established, so that the storage node writes data into the partitions according to the mapping relationship. That is to say, with the increase of data amount, this scheme can increase rolling blocks continuously, and at the same time split each rolling block into N partitions, so that the dynamic increase of partitions can be realized by increasing rolling blocks continuously to deal with the writing pressure of data, which not only can improve the system performance, but also avoid the problems of maintenance cost and performance loss caused by the data splitting and merging process.

Figure 4:
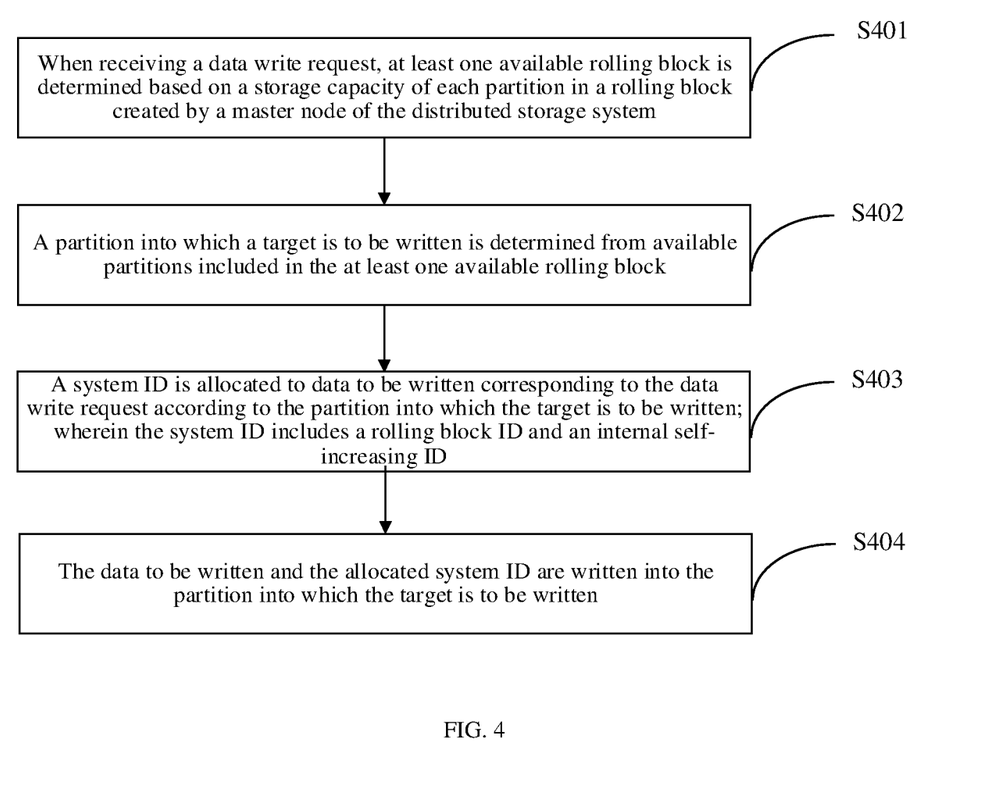
FIG. 4 is a flowchart of a data processing method according to an embodiment of the present disclosure.

FIG. 4 is a flowchart of a data processing method according to an embodiment of the present disclosure. A data processing method according to an embodiment of the present disclosure is applied to a storage node in a distributed storage system. As shown in FIG. 4, the method includes the following steps.

Step S401, when receiving a data write request, at least one available rolling block is determined based on a storage capacity of each partition in a rolling block created by a master node of the distributed storage system.

In some embodiments of the present disclosure, a client can send a data write request to the storage node in the distributed storage system through an API interface. The data write request can include data to be written, and can also include information such as a user-defined ID of the data to be written.

The available rolling blocks refer to rolling blocks including available partitions. The available partitions refer to partitions that are not fully written, that is, partitions whose storage capacity does not reach the upper limit. That is to say, based on the storage capacity of each partition in the rolling blocks created by the master node of the distributed storage system, the available partitions whose storage capacity does not reach the upper limit is determined from all the partitions of the rolling blocks, and the rolling blocks corresponding to the available partitions are taken as the available rolling blocks.

Step S402, a partition into which a target is to be written is determined from available partitions included in the at least one available rolling block.

As an example, determining a partition into which a target is to be written from available partitions included in the at least one available rolling block can be realized by determining the partition into which the target is to be written from the available partitions included in the at least one available rolling block based on a preset allocation strategy. For example, if the allocation strategy is to assign partitions randomly, the storage node can randomly select a partition from the available partitions included in the at least one available rolling block as the partition into which the target is to be written. If the allocation strategy is a proximity write rule, the storage node can judge whether there is a partition included in the current storage node among the available partitions included in the at least one available rolling block, and if so, the partition included in the current storage node is determined as the partition into which the target is to be written. If the allocation strategy is to determine the partition by polling, the storage node can select a next partition from the available partitions included in the at least one available rolling block as the partition into which the target is to be written based on the partition of the previous written data according to the polling order.

In some embodiments of the present disclosure, if the number of the partition carries the number of the rolling block where the partition is located, for example, the number of a first partition in a first rolling block is 1-1 and the number of a fifth partition in a second rolling block is 2-5, after the partition into which the target is to be written is determined, the rolling block where the partition is located can be determined according to the number of the partition into which the target is to be written. If the number of the rolling block does not carry the number of the rolling block where the partition is located, the rolling block where the partition into which the target is to be written is located can be determined based on the corresponding relationship between the rolling block and the partition.

Step S403, a system ID is allocated to data to be written corresponding to the data write request according to the partition into which the target is to be written; wherein the system ID includes a rolling block ID and an internal self-increasing ID.

In some embodiments of the present disclosure, the rolling block ID refers to the number of the rolling block where the partition into which the target is to be written is located. For example, if the partition into which the target is to be written is in a third rolling block, the rolling block ID in the system ID allocated to the data to be written is 3. The internal self-increasing ID refers to the identification information assigned to data based on the writing order when the storage node writes data.

Figure 5:
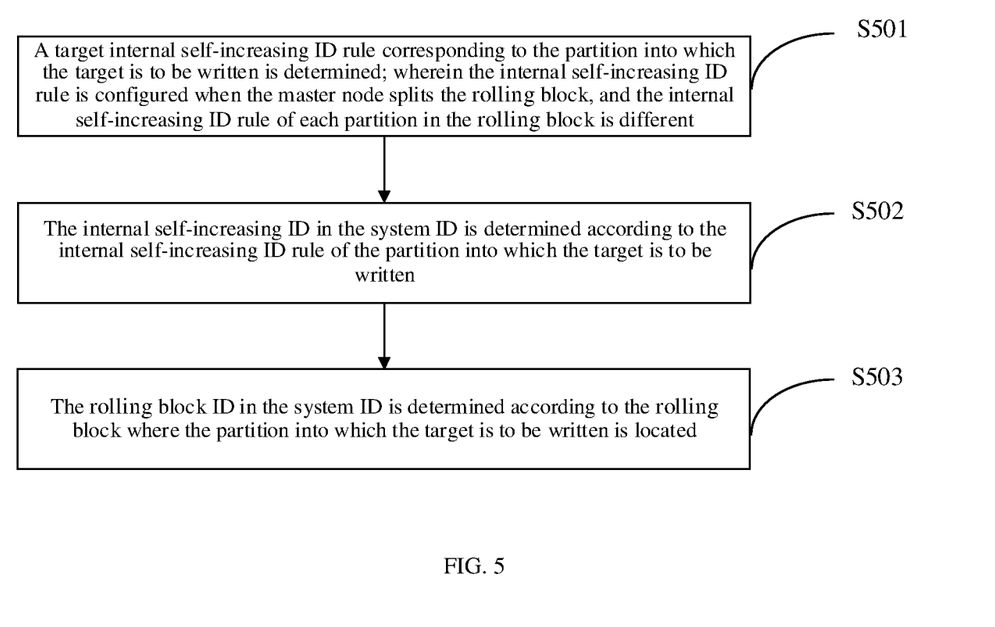
FIG. 5 is a flowchart of determining an internal self-increasing ID of data to be written in an embodiment of the present disclosure.

As a possible implementation, when the master node splits the rolling block into N partitions, the master node can configure an internal self-increasing ID rule for each partition. In this case, the storage node can determine the internal self-increasing ID of the data to be written based on the target internal self-increasing ID rule corresponding to the partition into which the target is to be written. As shown in FIG. 5, the implementation of this step may include the following steps.

Step S501, a target internal self-increasing ID rule corresponding to the partition into which the target is to be written is determined; wherein the internal self-increasing ID rule is configured when the master node splits the rolling block, and the internal self-increasing ID rule of each partition in the rolling block is different.

The target internal self-increasing ID rule of the partition into which the target is to be written can be distributed by the master node to each storage node, or the storage node can send the request information of the internal self-increasing ID rule of the partition into which the target is to be written to the master node. The master node sends the target internal self-increasing ID rule of the partition into which the target is to be written to the corresponding storage node after receiving the request information.

Step S502, the internal self-increasing ID in the system ID is determined according to the internal self-increasing ID rule of the partition into which the target is to be written.

Step S503, the rolling block ID in the system ID is determined according to the rolling block where the partition into which the target is to be written is located.

The rolling block ID refers to the number of the rolling block where the partition into which the target is to be written is located. For example, if the partition into which the target is to be written is in a third rolling block, the rolling block ID in the system ID allocated to the data to be written is 3.

As an example, if the rolling block where the partition into which the target is to be written is located includes two partitions, namely partition A and partition B, the partition into which the target is to be written is partition A. Moreover, the internal self-increasing ID rule is as follows: the internal self-increasing ID in partition A is odd. In this way, when the local storage node writes data into the partition into which the target is to be written, the internal self-increasing ID allocated to the data is odd. If the internal self-increasing ID of the previous data written by the storage node into partition A is 3, the internal self-increasing ID in the system ID allocated by the storage node to the data to be written is 5. If the partition into which the target is to be written is in a third rolling block, the system ID of the data to be written is (3,5), where 3 is the number of the rolling block, and 5 is the internal self-increasing ID.

As another example, if the rolling block where the partition into which the target is to be written is located includes 128 partitions, namely, partition 1, partition 2 . . . partition 128, where partition 3 is the partition into which the target is to be written. Moreover, the internal self-increasing ID rule of partition 3 is that the internal self-increasing ID is modulo 128 hash with the result of 3. If the internal self-increasing ID of the previous written data in partition 3 is 3, the internal self-increasing ID allocated by the storage node to the data to be written is 131. If the partition into which the target is to be written is in the third rolling block, the system ID of the data to be written is (3,131), where 3 is the number of the rolling block, and 131 is the internal self-increasing ID.

Step S404, the data to be written and the allocated system ID are written into the partition into which the target is to be written.

It can be understood that the storage node currently executing the data processing method may or may not include the partition into which the target is to be written. Since the storage node including the partition into which the target is to be written needs to perform data writing, it can be judged whether the partition into which the target is to be written is in the storage node before writing.

As a possible implementation, the implementation of Step S404 includes: determining whether the partition into which the target is to be written is in the storage node based on a mapping relationship between each partition and the storage node established by the master node; if the partition into which the target is to be written is in the storage node, writing the data to be written and the allocated system ID into the partition into which the target is to be written; otherwise, sending the data to be written to the storage node where the partition into which the target is to be written is located. For example, if the storage node 1 receives a data write request, the determined partition into which the target is to be written is not in the current storage node 1, but under other storage nodes, the data to be written is sent to the storage node where the partition into which the target is to be written is located. The data to be written, the determined partition into which the target is to be written and the system ID can also be sent to the storage node where the partition into which the target is to be written is located.

The storage node where the partition into which the target is to be written is located finishes writing the data after receiving the data write request.

In other embodiments of the present disclosure, the data partitioning method further includes reporting the storage capacity of each partition included in the storage node to the master node in the distributed storage system. As an example, the storage node reports the storage capacity of each partition included in the storage node to the master node of the distributed storage system after each data write.

According to the data processing method of the embodiment of the present disclosure, when a storage node in a distributed storage system receives a data write request, at least one available rolling block is determined based on a storage capacity of each partition in a rolling block created by a master node of the distributed storage system, a partition into which a target is to be written is determined from available partitions included in the at least one available rolling block, a system ID is allocated to data to be written according to the partition into which the target is to be written, and the data to be written is written into the partition into which the target is to be written. This scheme is based on the logical structure of rolling blocks and partitions established by the master node, and the storage node writes data into each partition, so that the system performance can be improved by the above partitioning method. In addition, the complexity of data routing can be greatly reduced by assigning the rolling block ID and the system ID of the internal self-increasing ID to the data based on the internal self-increasing ID rule.

For data writing with a user-defined ID, in order to make its user-defined ID still valid, the present disclosure further provides another embodiment.

Figure 6:
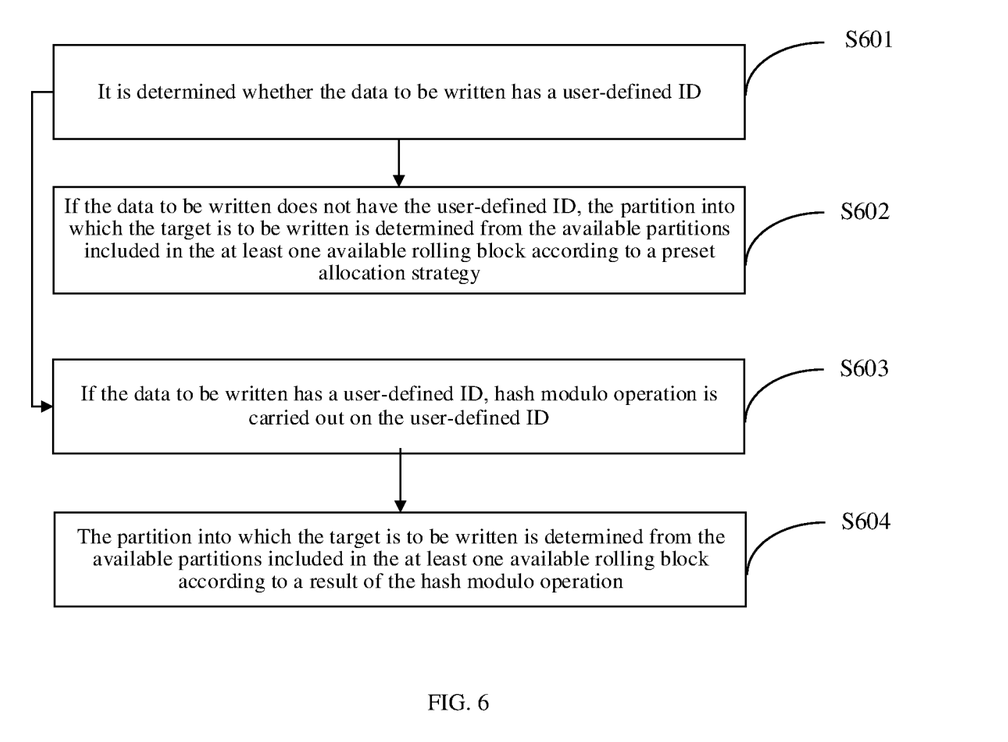
FIG. 6 is a flowchart of determining a partition into which a target is to be written in an embodiment of the present disclosure.

FIG. 6 is a flowchart of determining a partition into which a target is to be written in an embodiment of the present disclosure. As shown in FIG. 6, the implementation process of determining the partition into which the target is to be written from the available partitions included in the at least one available rolling block in Step S403 in FIG. 4 may include the following steps.

Step S601, it is determined whether the data to be written has a user-defined ID.

Step S602, if the data to be written does not have the user-defined ID, the partition into which the target is to be written is determined from the available partitions included in the at least one available rolling block according to a preset allocation strategy.

The preset allocation strategy can be to assign partitions randomly, a proximity write rule, a rule of determining the partition by polling, or other strategies. As an example, if the allocation strategy is to randomly designate partitions, the storage node can randomly select a partition from the available partitions included in the at least one available rolling block as the partition into which the target is to be written. If the allocation strategy is a proximity write rule, the storage node can determine the partition included in the storage node from the available partitions included in the at least one available rolling block, and determine the partition included in the storage node as the partition into which the target is to be written. If the allocation strategy is to determine the partition by polling, the storage node can select a next partition from the available partitions included in the at least one available rolling block as the partition into which the target is to be written based on the partition of the previous written data according to the polling order.

Step S603, if the data to be written has a user-defined ID, hash modulo operation is carried out on the user-defined ID.

Step S604, the partition into which the target is to be written is determined from the available partitions included in the at least one available rolling block according to a result of the hash modulo operation.

In the embodiment of the present disclosure, carrying out hash modulo operation on the user-defined ID means that the user-defined ID is hashed to obtain a numerical value, and then the obtained numerical value is subjected to modulo operation according to the number N of partitions in the rolling block.

As an example, if the currently written data corresponds to the second rolling block, the number of partitions in the second rolling block is 128, and the modulo operation result of the user-defined ID hash is 5, a fifth partition in the second rolling block is taken as the partition into which the target is to be written.

As another example, the implementation process of Step S604 may include determining a partition into which a target is to be written that matches the result of the hash modulo operation from the available partitions included in the at least one available rolling block according to the order in which the rolling blocks are created. For example, there are three available rolling blocks, namely, the second rolling block, the third rolling block and the fourth rolling block, which are created in the following order: the second rolling block is earlier than the third rolling block, and the third rolling block is earlier than the fourth rolling block. If the result of the hash modulo operation is 5, it is first judged whether the fifth partition in the second rolling block is available, if so, the fifth partition in the second rolling block is taken as the partition into which the target is to be written, otherwise, it is continuously judged whether the fifth partition in the third rolling block is available, and so on. In this way, data can be written into the partition of the first created rolling block first, so as to avoid the situation that a plurality of rolling blocks run in parallel and reduce the calculation amount of the system.

According to the data processing method of the embodiment of the present disclosure, by judging whether the data to be written contains the user-defined ID, and aiming at the case that the user-defined ID is contained, the partition into which the target is to be written is determined by hash modulo, so that the compatibility of the user-defined ID can be realized, and the compatibility of the distributed storage system can be improved.

Next, the process of data modification, deletion and query will be introduced.

Figure 7:
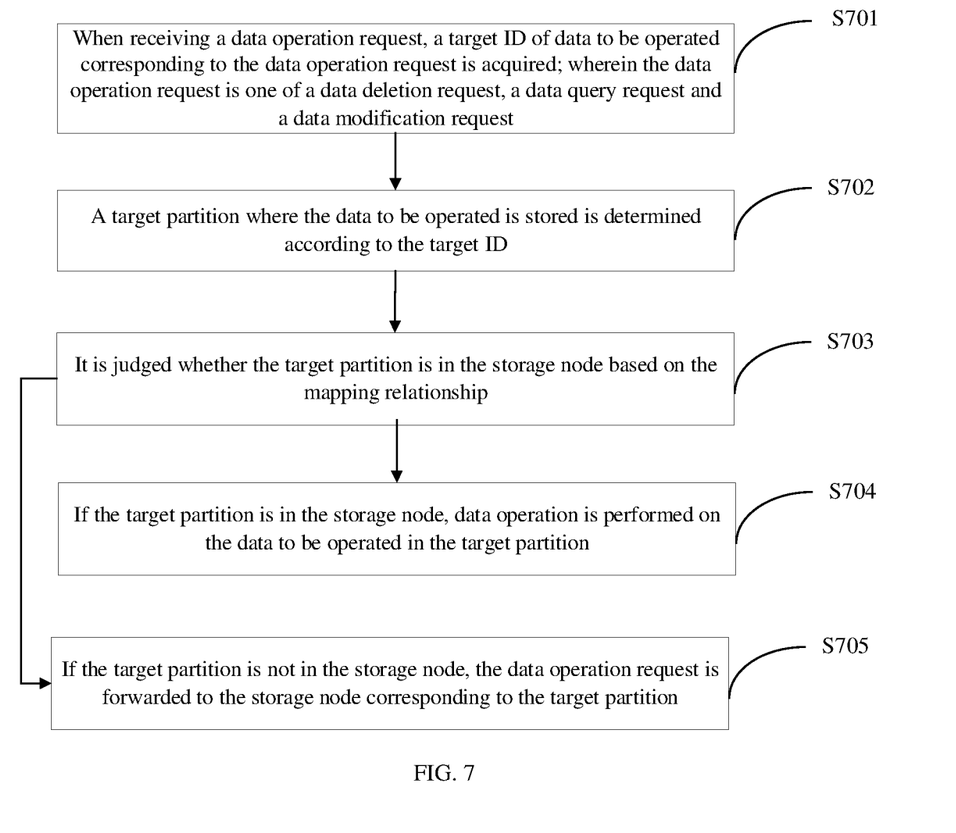
FIG. 7 is a flowchart of a data processing method according to an embodiment of the present disclosure.

FIG. 7 is a flowchart of a data processing method according to an embodiment of the present disclosure. As shown in FIG. 7, in addition to the steps involved in FIG. 4, the method further includes the following steps.

Step S701, when receiving a data operation request, a target ID of data to be operated corresponding to the data operation request is acquired; wherein the data operation request is one of a data deletion request, a data query request and a data modification request.

It should be noted that the target ID can be the system ID of the data to be operated corresponding to the data operation request, or the user-defined ID of the data to be operated corresponding to the data operation request, which is equivalent to the ID passed in when the client initiates the data operation request.

Step S702, a target partition where the data to be operated is stored is determined according to the target ID.

In some embodiments of the present disclosure, Step S702 may include the following steps: judging whether the target ID is a system ID; if the target ID is a system ID, determining a target rolling block ID and a target internal self-increasing ID in the target ID; acquiring an internal self-increasing ID rule of each partition in a target rolling block corresponding to the target rolling block ID; determining the target partition according to the target internal self-increasing ID based on the internal self-increasing ID rule of each partition in the target rolling block; if the target ID is a user-defined ID, carrying out hash modulo operation on the target ID, and determining the target partition based on a result of the hash modulo operation.

Whether the target ID is a system ID can be determined based on the rule difference between the system ID and the user-defined ID, or based on the identification information of the target ID. As an example, if it is specified that the system ID contains ",", and the user-defined ID does not contain ",", it can be determined whether the target ID is a system ID according to whether the target ID contains ",".

It can be understood that the rolling block ID and the internal self-increasing ID can be determined according to the system ID, so that a target partition can be accurately determined. Through the user-defined ID, only hash modulo can calculate which partition of the rolling block the data to be operated is in, but since it is not possible to determine which rolling block the data is in, there may be a plurality of determined target partitions. For example, there are three rolling blocks in total, and it can be determined that the data to be operated is the fourth partition in the rolling block through the user-defined ID. Therefore, there are three determined target partitions, namely the fourth partition in the first rolling block, the fourth partition in the second rolling block and the fourth partition in the third rolling block.

Step S703, it is judged whether the target partition is in the storage node based on the mapping relationship.

Step S704, if the target partition is in the storage node, data operation is performed on the data to be operated in the target partition.

Step S705, if the target partition is not in the storage node, the data operation request is forwarded to the storage node corresponding to the target partition.

According to the data processing method of the embodiment of the present disclosure, when receiving a modification request, a deletion request or a query request, the location of the target partition where the data is located can be determined according to the ID, so that the data positioning speed can be improved, the complexity of data positioning can be reduced, and the system performance can be further improved.

In order to realize the above embodiments, the present disclosure provides a data partitioning device.

Figure 8:
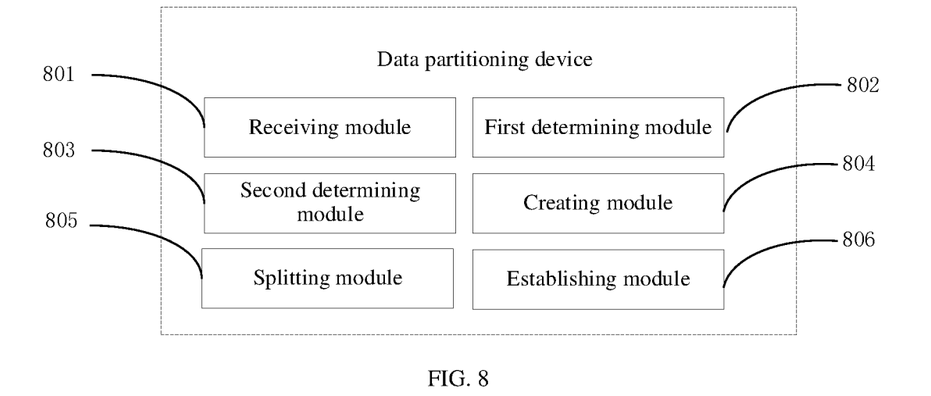
FIG. 8 is a structural block diagram of a data partitioning device according to an embodiment of the present disclosure.

FIG. 8 is a structural block diagram of a data partitioning device according to an embodiment of the present disclosure. The device is applied to a master node in a distributed storage system. As shown in FIG. 8, the device includes:

a receiving module 801, which is configured to receive a partitioned storage capacity sent by each storage node in the distributed storage system; wherein the partitioned storage capacity is a storage capacity of each partition included in the storage node;

a first determining module 802, which is configured to determine a storage capacity of an i-th rolling block according to the partitioned storage capacity, where i is a positive integer;

a second determining module 803, which is configured to determine whether the storage capacity of the i-th rolling block meets a preset condition according to the storage capacity of the i-th rolling block;

a creating module 804, which is configured to create an (i+1)-th rolling block in response to the fact that the storage capacity of the i-th rolling block meets a preset condition; wherein the (i+1)-th rolling block is capable of accommodating M pieces of data, where M is a positive integer;

a splitting module 805, which is configured to split the (i+1)-th rolling block into N partitions on average, where N is an integer greater than or equal to 2; and an establishing module 806, which is configured to establish a mapping relationship between N partitions in the (i+1)-th rolling block and storage nodes in the distributed storage system, so that the storage node writes data into the partitions according to the mapping relationship.

According to the data partitioning device of the embodiment of the present disclosure, a master node receives a partitioned storage capacity sent by each storage node, a storage capacity of an i-th rolling block is determined according to the partitioned storage capacity; it is determined whether the storage capacity of the i-th rolling block meets a preset condition according to the storage capacity of the i-th rolling block; an (i+1)-th rolling block is created if the storage capacity of the i-th rolling block meets a preset condition, the (i+1)-th rolling block is split into N partitions on average, and a mapping relationship between N partitions in the (i+1)-th rolling block and storage nodes is established, so that the storage node writes data into the partitions according to the mapping relationship. That is to say, with the increase of data amount, this scheme can increase rolling blocks continuously, and at the same time split each rolling block into N partitions, so that the dynamic increase of partitions can be realized by increasing rolling blocks continuously to deal with the writing pressure of data, which not only can improve the system performance, but also avoid the problems of maintenance cost and performance loss caused by the data splitting and merging process.

In order to realize the above embodiments, the present disclosure further provides a data processing device.

Figure 9:
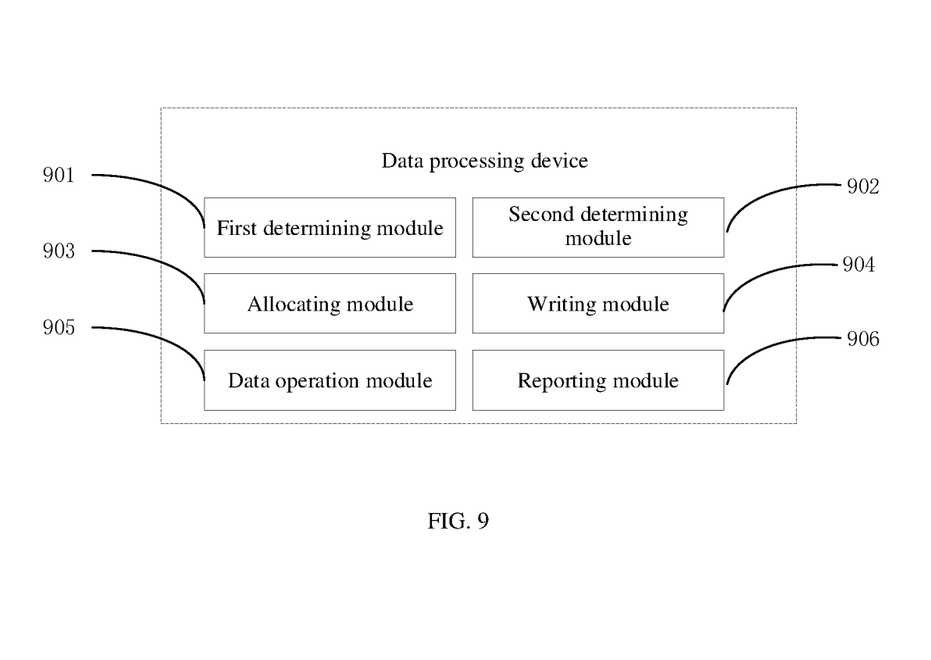
FIG. 9 is a structural block diagram of a data processing device according to an embodiment of the present disclosure.

FIG. 9 is a structural block diagram of another data processing device according to an embodiment of the present disclosure. The device is applied to a storage node in a distributed storage system. As shown in FIG. 9, the device includes:

a first determining module 901, which is configured to, when receiving a data write request, determine at least one available rolling block based on a storage capacity of each partition in a rolling block created by a master node of the distributed storage system;

a second determining module 902, which is configured to determine a partition into which a target is to be written from available partitions included in the at least one available rolling block;

an allocating module 903, which is configured to allocate a system ID to data to be written corresponding to the data write request according to the partition into which the target is to be written; wherein the system ID includes a rolling block ID and an internal self-increasing ID;

a writing module 904, which is configured to write the data to be written and the allocated system ID into the partition into which the target is to be written.

As a possible implementation, the writing module 904 is specifically configured to:

determine whether the partition into which the target is to be written is in the storage node based on a mapping relationship between each partition and the storage node established by the master node;

if the partition into which the target is to be written is in the storage node, write the data to be written and the allocated system ID into the partition into which the target is to be written; otherwise, send a data write request to the storage node where the partition into which the target is to be written is located.

In some embodiments of the present disclosure, the second determining module 902 is specifically configured to:

determine whether the data to be written has a user-defined ID;

if the data to be written does not have the user-defined ID, determine the partition into which the target is to be written from the available partitions included in the at least one available rolling block according to a preset allocation strategy;

if the data to be written has a user-defined ID, carry out hash modulo operation on the user-defined ID;

determine the partition into which the target is to be written from the available partitions included in the at least one available rolling block according to a result of the hash modulo operation.

As an example, the second determining module 902 is further configured to:

determine a partition into which a target is to be written that matches the result of the hash modulo operation from the available partitions included in the at least one available rolling block according to the order in which the rolling blocks are created.

In some embodiments of the present disclosure, the allocating module 903 is specifically configured to:

determine a target internal self-increasing ID rule corresponding to the partition into which the target is to be written; wherein the internal self-increasing ID rule is configured when the master node splits the rolling block, and the internal self-increasing ID rule of each partition in the rolling block is different;

determine the internal self-increasing ID in the system ID according to the internal self-increasing ID rule of the partition into which the target is to be written;

determine the rolling block ID in the system ID according to the rolling block where the partition into which the target is to be written is located.

In other embodiments of the present disclosure, the device further includes a data operation module 905, wherein the data operation module 905 is configured to:

when receiving a data operation request, acquire a target ID of data to be operated corresponding to the data operation request; wherein the data operation request is one of a data deletion request, a data query request and a data modification request;

determine a target partition where the data to be operated is stored according to the target ID;

judge whether the target partition is in the storage node based on the mapping relationship;

if the target partition is in the storage node, perform data operation on the data to be operated in the target partition;

if the target partition is not in the storage node, forward the data operation request to the storage node corresponding to the target partition.

As an example, the data operation module 905 is specifically configured to:

judge whether the target ID is a system ID;

if the target ID is a system ID, determine a target rolling block ID and a target internal self-increasing ID in the target ID;

acquire an internal self-increasing ID rule of each partition in a target rolling block corresponding to the target rolling block ID;

determine the target partition according to the target internal self-increasing ID based on the internal self-increasing ID rule of each partition in the target rolling block;

if the target ID is a user-defined ID, carry out hash modulo operation on the target ID, and determine the target partition based on a result of the hash modulo operation.

In addition, the device further includes a reporting module 906, wherein the reporting module 906 is specifically configured to:

report the storage capacity of each partition included in the storage node to the master node in the distributed storage system.

According to the data processing device of the embodiment of the present disclosure, when a storage node in a distributed storage system receives a data write request, at least one available rolling block is determined based on a storage capacity of each partition in a rolling block created by a master node of the distributed storage system, a partition into which a target is to be written is determined from available partitions included in the at least one available rolling block, a system ID is allocated to data to be written according to the partition into which the target is to be written, and the data to be written is written into the partition into which the target is to be written. This scheme is based on the logical structure of rolling blocks and partitions established by the master node, and the storage node writes data into each partition, so that the system performance can be improved by the above partitioning method. In addition, the complexity of data routing can be greatly reduced by assigning the rolling block ID and the system ID of the internal self-increasing ID to the data based on the internal self-increasing ID rule.

It should be noted that the above explanation of the embodiment of the data partitioning method is also applicable to the data partitioning device of this embodiment, which will not be described in detail here.

In the description of this specification, descriptions referring to the terms "one embodiment", "some embodiments", "examples", "specific examples" or "some examples" mean that specific features, structures, materials or characteristics described in connection with the embodiment or example are included in at least one embodiment or example of the present disclosure. In this specification, the schematic expressions of the above terms are not necessarily aimed at the same embodiment or example. Moreover, the specific features, structures, materials or characteristics which have been described may be combined in any one or more embodiments or examples in a suitable manner. In addition, those skilled in the art can incorporate and combine different embodiments or examples and features of different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features defined as "first" and "second" can explicitly or implicitly include at least one of these features. In the description of the present disclosure, "a plurality of" means at least two, such as two, three, etc., unless otherwise specifically defined.

Any process or method description in the flowchart or otherwise described herein can be understood as representing a module, segment or part of a code that includes one or more executable instructions for implementing the steps of the customized logic function or process, and the scope of preferred embodiments of the present disclosure includes other implementations, in which the function can be performed out of the order shown or discussed, including in a substantially simultaneous manner or in the reverse order according to the functions involved, which should be understood by those skilled in the technical field to which embodiments of the present disclosure belong.

The logic and/or steps represented in the flowchart or described in other ways herein, for example, can be regarded as a sequenced list of executable instructions for implementing logical functions, and can be embodied in any computer-readable medium for use by or in connection with an instruction execution system, device or apparatus (such as a computer-based system, a system including a processor or other systems that can fetch instructions from and execute instructions from the instruction execution system, device or apparatus). For the purposes of this specification, a "computer-readable medium" can be any device that can contain, store, communicate, propagate or transmit a program for use by the instruction execution system, device or apparatus or in connection with the instruction execution system, device or apparatus. More specific examples (a non-exhaustive list) of the computer-readable medium include: an electrical connection part (electronic device) with one or more wires, a portable computer disk box (a magnetic device), a Random Access Memory (RAM), a Read-Only Memory (ROM), an Erasable Programmable Read-Only Memory (EPROM or a flash memory), an optical fiber device, and a portable Compact Disk Read Only Memory (CD-ROM). In addition, the computer-readable medium may even be paper or other suitable medium on which the program can be printed, because the program can be obtained electronically by, for example, optically scanning the paper or other medium, followed by editing, interpreting or processing in other suitable ways if necessary, and then the program is stored in a computer memory.

It should be understood that various parts of the present disclosure can be implemented in hardware, software, firmware or a combination thereof. In the above embodiments, a plurality of steps or methods can be implemented by software or firmware stored in a memory and executed by an appropriate instruction execution system. For example, if the steps or methods are implemented by hardware, as in another embodiment, they can be implemented by any one of the following technologies known in the art or their combination: discrete logic circuits with logic gates for implementing logic functions on data signals, application specific integrated circuits with appropriate combinational logic gates, Programmable Gate Arrays (PGAs), Field Programmable Gate Arrays (FPGAs), etc.

Those skilled in the art can understand that all or part of the steps carried by the method of the above embodiment can be completed by instructing related hardware through a program, which can be stored in a computer-readable storage medium. The program, when executed, includes one of the steps of the method embodiment or a combination thereof.

In addition, each functional unit in each embodiment of the present disclosure can be integrated in one processing module, or each unit can exist physically alone, or two or more units can be integrated in one module. The above integrated modules can be implemented in the form of hardware or software functional modules. The integrated module can also be stored in a computer-readable storage medium if it is implemented in the form of a software functional module and sold or used as an independent product.

The storage medium mentioned above can be a read-only memory, a magnetic disk or an optical disk, etc. Although the embodiments of the present disclosure have been shown and described above, it can be understood that the above embodiments are exemplary and cannot be understood as limitations of the present disclosure, and those skilled in the art can make changes, modifications, substitutions and variations to the above embodiments within the scope of the present disclosure.

What is claimed is:

1. A data partitioning method, wherein the method is applied to a master node in a distributed storage system, comprising:
receiving a partitioned storage capacity sent by each storage node in the distributed storage system; wherein the partitioned storage capacity is a storage capacity of each partition comprised in the storage node;
determining a storage capacity of an i-th rolling block according to the partitioned storage capacity, where i is a positive integer;
determining whether the storage capacity of the i-th rolling block meets a preset condition according to the storage capacity of the i-th rolling block;
creating an (i+1)-th rolling block in response to the fact that the storage capacity of the i-th rolling block meets a preset condition; wherein the (i+1)-th rolling block is capable of accommodating M pieces of data, where M is a positive integer;
splitting the (i+1)-th rolling block into N partitions on average, where N is an integer greater than or equal to 2; and
establishing a mapping relationship between N partitions in the (i+1)-th rolling block and storage nodes in the distributed storage system, so that the storage node writes data into the partitions according to the mapping relationship.

2. A data processing method, wherein the method is applied to a storage node in a distributed storage system, comprising:
when receiving a data write request, determining at least one available rolling block based on a storage capacity of each partition in a rolling block created by a master node of the distributed storage system;
determining a partition into which a target is to be written from available partitions comprised in the at least one available rolling block;
allocating a system ID to data to be written corresponding to the data write request according to the partition into which the target is to be written; wherein the system ID comprises a rolling block ID and an internal self-increasing ID;
writing the data to be written and the allocated system ID into the partition into which the target is to be written;
wherein determining a partition into which a target is to be written from available partitions comprised in the at least one available rolling block comprises:
determining whether the data to be written has a user-defined ID;
if the data to be written does not have the user-defined ID, determining the partition into which the target is to be written from the available partitions comprised in the at least one available rolling block according to a preset allocation strategy;
if the data to be written has a user-defined ID, carrying out hash modulo operation on the user-defined ID;
determining the partition into which the target is to be written from the available partitions comprised in the at least one available rolling block according to a result of the hash modulo operation.

3. The method according to claim 2, wherein determining the partition into which the target is to be written from the available partitions comprised in the at least one available rolling block according to a result of the hash modulo operation comprises:
determining a partition into which a target is to be written that matches the result of the hash modulo operation from the available partitions comprised in the at least one available rolling block according to the order in which the rolling blocks are created.

4. The method according to claim 2, wherein allocating a system ID to data to be written corresponding to the data write request according to the partition into which the target is to be written comprises:
determining a target internal self-increasing ID rule corresponding to the partition into which the target is to be written; wherein the internal self-increasing ID rule is configured when the master node splits the rolling block, and the internal self-increasing ID rule of each partition in the rolling block is different;
determining the internal self-increasing ID in the system ID according to the internal self-increasing ID rule of the partition into which the target is to be written;
determining the rolling block ID in the system ID according to the rolling block where the partition into which the target is to be written is located.

5. The method according to claim 4, further comprising:
when receiving a data operation request, acquiring a target ID of data to be operated corresponding to the data operation request; wherein the data operation request is one of a data deletion request, a data query request and a data modification request;
determining a target partition where the data to be operated is stored according to the target ID;
judging whether the target partition is in the storage node based on the mapping relationship;
if the target partition is in the storage node, performing data operation on the data to be operated in the target partition;
if the target partition is not in the storage node, forwarding the data operation request to the storage node corresponding to the target partition.

6. The method according to claim 5, wherein determining a target partition where the data to be operated is stored according to the target ID comprises:
judging whether the target ID is a system ID;
if the target ID is a system ID, determining a target rolling block ID and a target internal self-increasing ID in the target ID;
acquiring an internal self-increasing ID rule of each partition in a target rolling block corresponding to the target rolling block ID;
determining the target partition according to the target internal self-increasing ID based on the internal self-increasing ID rule of each partition in the target rolling block;
if the target ID is a user-defined ID, carrying out hash modulo operation on the target ID, and determining the target partition based on a result of the hash modulo operation.

7. The method according to claim 2, further comprising:
reporting the storage capacity of each partition comprised in the storage node to the master node in the distributed storage system.

8. A data partitioning processor/controller/circuit, wherein the processor/controller/circuit is applied to a master node in a distributed storage system, comprising:
a receiving module, which is configured to receive a partitioned storage capacity sent by each storage node in the distributed storage system; wherein the partitioned storage capacity is a storage capacity of each partition comprised in the storage node;

a first determining module, which is configured to determine a storage capacity of an i-th rolling block according to the partitioned storage capacity, where i is a positive integer;

a second determining module, which is configured to determine whether the storage capacity of the i-th rolling block meets a preset condition according to the storage capacity of the i-th rolling block;

a creating module, which is configured to create an (i+1)-th rolling block in response to the fact that the storage capacity of the i-th rolling block meets a preset condition; wherein the (i+1)-th rolling block is capable of accommodating M pieces of data, where M is a positive integer;

a splitting module, which is configured to split the (i+1)-th rolling block into N partitions on average, where N is an integer greater than or equal to 2; and an establishing module, which is configured to establish a mapping relationship between N partitions in the (i+1)-th rolling block and storage nodes in the distributed storage system, so that the storage node writes data into the partitions according to the mapping relationship.

\* \* \* \* \*